(12) United States Patent
Brousseau et al.

(10) Patent No.: US 12,718,020 B2
(45) **Date of Patent: *Aug. 25, 2026**

(54) DYNAMIC ATTRIBUTE EXTRACTION SYSTEMS AND METHODS FOR ARTIFICIAL INTELLIGENCE PLATFORM

(71) Applicant: OPEN TEXT CORPORATION, Waterloo (CA)

(72) Inventors: Martin Brousseau, Mont-Saint-Hilaire (CA); Renaud Levert, Montreal (CA)

(73) Assignee: OPEN TEXT CORPORATION, Waterloo (CA)

( * ) Notice: Subject to any disclaimer, the term of this patent is extended or adjusted under 35 U.S.C. 154(b) by 582 days.

This patent is subject to a terminal disclaimer.

(21) Appl. No.: 18/302,494

(22) Filed: Apr. 18, 2023

(65) Prior Publication Data

US 2023/0259710 A1 Aug. 17, 2023

Related U.S. Application Data

(63) Continuation of application No. 17/067,335, filed on Oct. 9, 2020, now Pat. No. 11,681,874.

(60) Provisional application No. 62/914,167, filed on Oct. 11, 2019.

(51) Int. Cl.

| | |
|---|---|
| ***G06F 40/295*** | (2020.01) |
| ***G06F 16/30*** | (2019.01) |
| ***G06F 40/157*** | (2020.01) |
| ***G06F 40/49*** | (2020.01) |
| ***G06F 40/55*** | (2020.01) |

(52) U.S. Cl.

CPC ............ *G06F 40/295* (2020.01); *G06F 16/30* (2019.01); *G06F 40/157* (2020.01); *G06F 40/49* (2020.01); *G06F 40/55* (2020.01)

(58) Field of Classification Search

CPC ........ G06F 40/295; G06F 16/30; G06F 16/38; G06F 16/93; G06F 16/954; G06F 40/284; G06F 40/30; G06F 40/157; G06F 40/55; G06F 40/49

See application file for complete search history.

(56) References Cited

U.S. PATENT DOCUMENTS 8,370,128 B2 * 2/2013 Brun ....................... G06F 40/30 704/10
2009/0240714 A1 * 9/2009 Keith ...................... G06F 40/30

(Continued)

*Primary Examiner* — Wilson W Tsui
(74) *Attorney, Agent, or Firm* — Sprinkle IP Law Group

(57) ABSTRACT

An AI platform may receive a request for information on text. The text is processed through a text mining pipeline for dynamic attribute extraction. An engine determines entities in the text and utilizes the entities to determine a relationship pattern. The engine identifies a trigger by matching one of the entities with a predefined entity in a utility authority file, locates an entity in close proximity to the trigger, identifies a value or regular expression in close proximity to the trigger in the text, and creates a triplet containing the entity, the trigger, and the value or regular expression, the triplet representing the relationship pattern. The engine applies an action to the triplet, wherein the action comprises obtaining the value from the text or translating the regular expression. The engine attaches the value or a result from the translating to the entity as a dynamic attribute of the entity.

20 Claims, 6 Drawing Sheets

(56) References Cited

U.S. PATENT DOCUMENTS

| | | | | |
|---|---|---|---|---|
| 2016/0179945 | A1* | 6/2016 | Lastra Diaz | G06F 16/284 707/739 |
| 2018/0232443 | A1* | 8/2018 | Delgo | G06F 16/35 |
| 2020/0210521 | A1* | 7/2020 | Hutchins | G06F 40/221 |
| 2021/0065045 | A1* | 3/2021 | Kummamuru | G06F 16/9038 |
| 2022/0222442 | A1* | 7/2022 | Akimoto | G06F 40/30 |

* cited by examiner

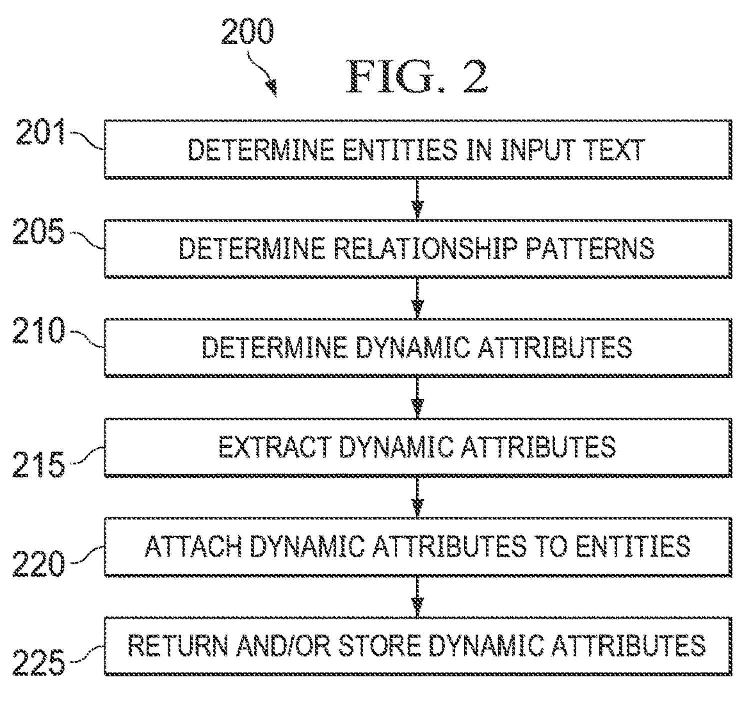
200
FIG. 2
201 DETERMINE ENTITIES IN INPUT TEXT
205 DETERMINE RELATIONSHIP PATTERNS
210 DETERMINE DYNAMIC ATTRIBUTES
215 EXTRACT DYNAMIC ATTRIBUTES
220 ATTACH DYNAMIC ATTRIBUTES TO ENTITIES
225 RETURN AND/OR STORE DYNAMIC ATTRIBUTES

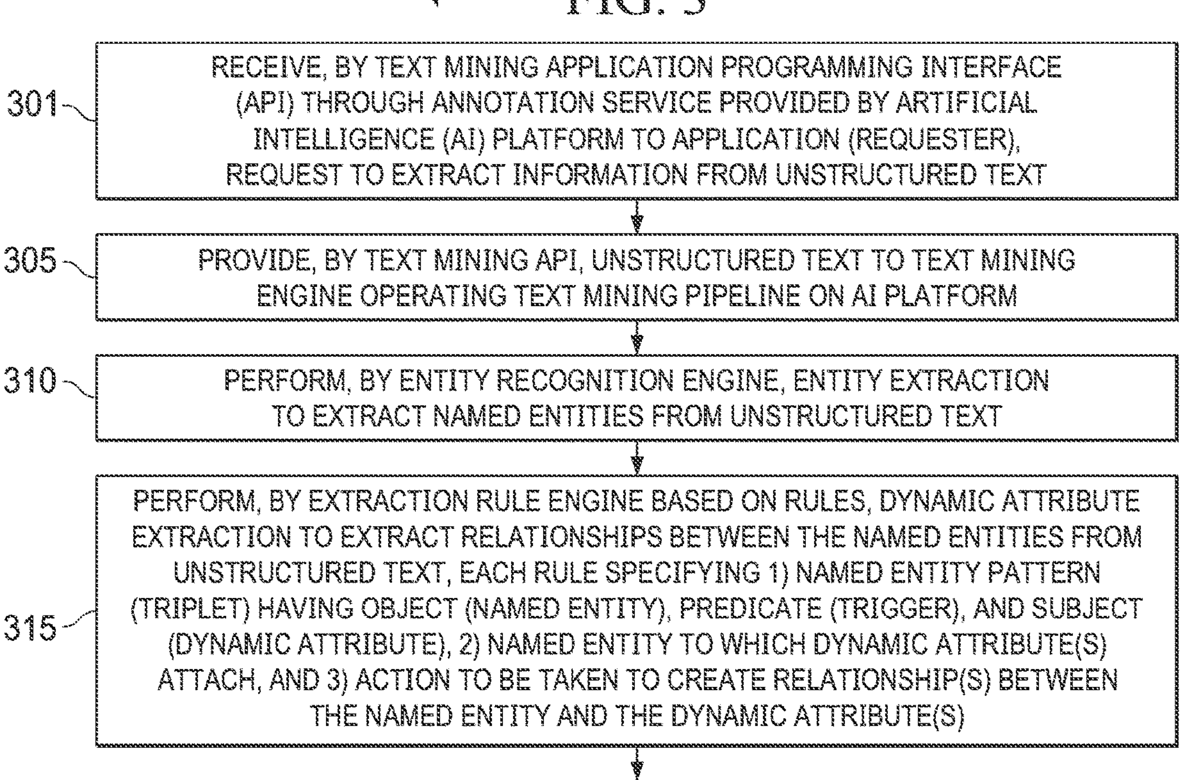
300
FIG. 3
301 RECEIVE, BY TEXT MINING APPLICATION PROGRAMMING INTERFACE (API) THROUGH ANNOTATION SERVICE PROVIDED BY ARTIFICIAL INTELLIGENCE (AI) PLATFORM TO APPLICATION (REQUESTER), REQUEST TO EXTRACT INFORMATION FROM UNSTRUCTURED TEXT
305 PROVIDE, BY TEXT MINING API, UNSTRUCTURED TEXT TO TEXT MINING ENGINE OPERATING TEXT MINING PIPELINE ON AI PLATFORM
310 PERFORM, BY ENTITY RECOGNITION ENGINE, ENTITY EXTRACTION TO EXTRACT NAMED ENTITIES FROM UNSTRUCTURED TEXT
315 PERFORM, BY EXTRACTION RULE ENGINE BASED ON RULES, DYNAMIC ATTRIBUTE EXTRACTION TO EXTRACT RELATIONSHIPS BETWEEN THE NAMED ENTITIES FROM UNSTRUCTURED TEXT, EACH RULE SPECIFYING 1) NAMED ENTITY PATTERN (TRIPLET) HAVING OBJECT (NAMED ENTITY), PREDICATE (TRIGGER), AND SUBJECT (DYNAMIC ATTRIBUTE), 2) NAMED ENTITY TO WHICH DYNAMIC ATTRIBUTE(S) ATTACH, AND 3) ACTION TO BE TAKEN TO CREATE RELATIONSHIP(S) BETWEEN THE NAMED ENTITY AND THE DYNAMIC ATTRIBUTE(S)
320 RETURN, BY TEXT MINING API THROUGH ANNOTATION SERVICE, ANNOTATED TEXT WITH NAMED ENTITIES AND RELATED DYNAMIC ATTRIBUTES TO APPLICATION (REQUESTER)

Figure 4A:
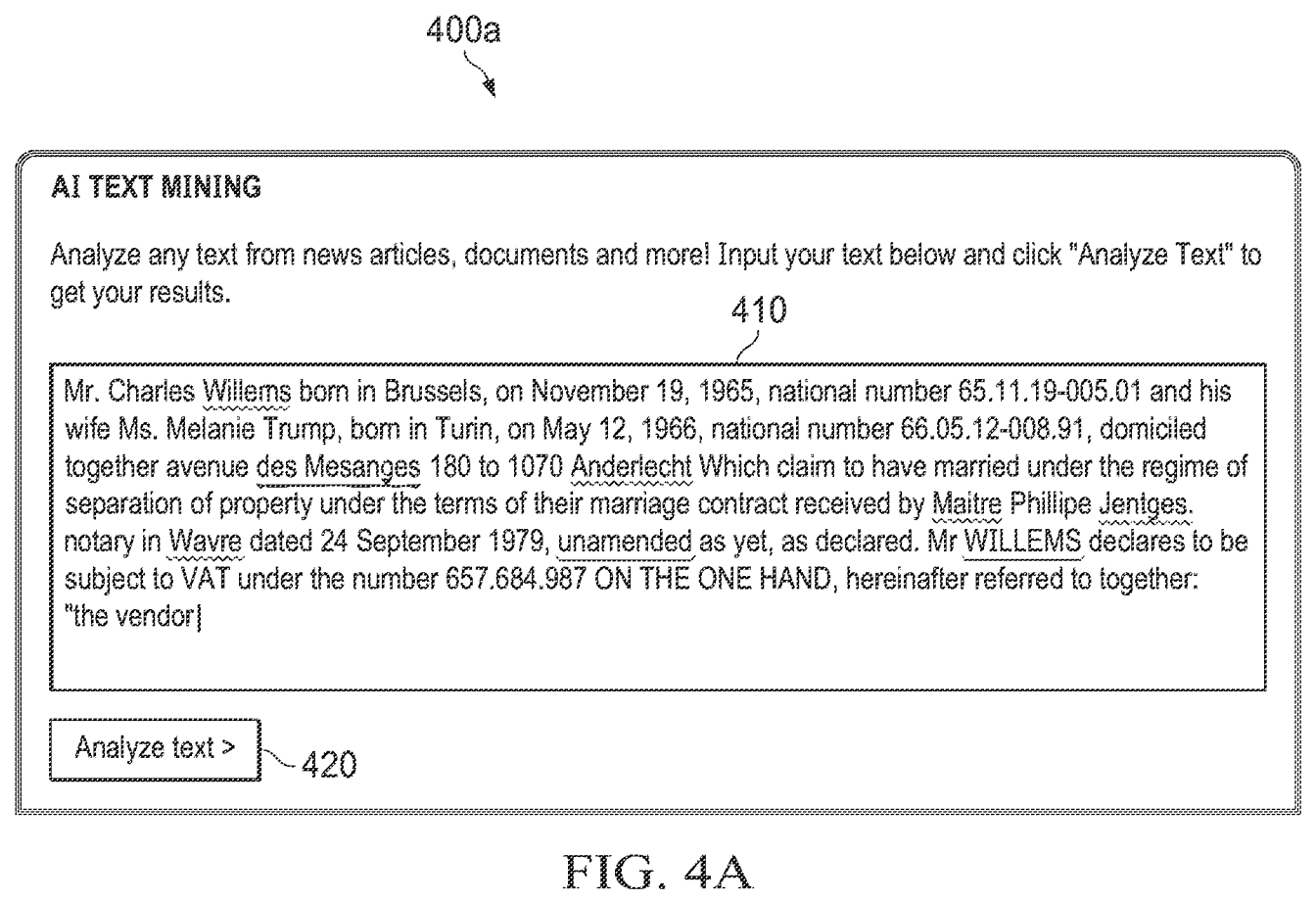

400a

AI TEXT MINING

Analyze any text from news articles, documents and more! Input your text below and click "Analyze Text" to get your results.

410

Mr. Charles Willems born in Brussels, on November 19, 1965, national number 65.11.19-005.01 and his wife Ms. Melanie Trump, born in Turin, on May 12, 1966, national number 66.05.12-008.91, domiciled together avenue des Mesanges 180 to 1070 Anderlecht Which claim to have married under the regime of separation of property under the terms of their marriage contract received by Maitre Phillipe Jentges. notary in Wavre dated 24 September 1979, unamended as yet, as declared. Mr WILLEMS declares to be subject to VAT under the number 657.684.987 ON THE ONE HAND, hereinafter referred to together: "the vendor|

Analyze text > 420

Analysis summary | Language: English | Overall tone: Neutral

Most Revelant People
Charles Willems, Melanie Trump, Maitre Philippe

Most Revelant Places
Brussels, Turin, Wavre, Walloon Brabant

Most Relevant Organizations
No Organizations found.

Most positive sentence
No positive sentence found.

Most negative sentence
No negative sentence found.

Topics & Summary | Entities | Concepts | Sentiment

430

Entities

*AI Text Mining automatically identifies entities (people, places, and organizations) in the text*

TURIN
MELANIE TRUMP
WAVRE, WALLOON BRABANT
BRUSSELS

Entity breakdown

| People (3) | Relevancy | Frequency |
|---|---|---|
| Charles Willems | 86% | 2 |
| Melanie Trump | 76% | 1 |
| Maitre Philippe | 71% | 1 |
| Places (3) | Relevancy | Frequency |
| Brussels | 77% | 1 |
| Turin | 75% | 1 |
| Wavre, Walloon Brabant | 70% | 1 |

FIG. 4B

DYNAMIC ATTRIBUTE EXTRACTION SYSTEMS AND METHODS FOR ARTIFICIAL INTELLIGENCE PLATFORM

CROSS-REFERENCE TO RELATED APPLICATIONS

This application is a continuation of, and claims a benefit of priority under 35 U.S.C. § 120 from, U.S. patent application Ser. No. 17/067,335, filed Oct. 9, 2020, issued as U.S. Pat. No. 11,681,874, entitled "DYNAMIC ATTRIBUTE EXTRACTION SYSTEMS AND METHODS FOR ARTIFICIAL INTELLIGENCE PLATFORM," which claims a benefit of priority under 35 U.S.C. § 119(e) from U.S. Provisional Application No. 62/914,167, filed Oct. 11, 2019, entitled "DYNAMIC ATTRIBUTE EXTRACTION SYSTEMS AND METHODS FOR ARTIFICIAL INTELLIGENCE PLATFORM." The entire contents of both applications are hereby expressly incorporated by reference for all purposes.

FIELD OF THE INVENTION

This invention relates generally to artificial intelligence (AI) and text mining. More particularly, this invention relates to dynamic attribute extraction systems, methods, and computer program products for an AI platform.

SUMMARY OF THE DISCLOSURE

Text mining refers to a process of analyzing text and extracting information from input text. A text mining engine, such as one used by an AI platform, can receive a request from a requester (e.g., an application) to mine information from the input text, which often contains unstructured data in a natural language. In response, the text mining engine may perform a plurality of functions (e.g., entity recognition) to extract information (e.g., entities) from the input text. The extracted information provided by the text mining engine can be used by the requester for various purposes (e.g., content analysis, big data analytics, business intelligence (BI) reporting, etc.).

Existing text mining engines generally do not have the ability to understand syntactical relationships embedded in unstructured text. Thus, while a text mining engine may extract entities such as people names, product names, contract numbers, model numbers, dates, locations, etc. from input text, it does not have the ability to understand syntactical relationships of those entities in the input text and provide relationship information for the entities thus extracted. That is, existing text mining engines do not have the capabilities to understand sentence structure, language rules, grammar, arrangement, or composition of words in a sentence. Without this understanding, existing text mining engines cannot create, report, and/or output entity relationships.

A goal of this disclosure is to provide a text mining solution that enables an engine (e.g., a text mining engine, a rules engine, an attribute extraction engine, etc.) to create relationships for entities in input text. In some embodiments, this goal can be achieved with systems, methods, and computer program products configured for dynamically extracting attributes from input text and attaching/associating the dynamically extracted attributes with the entities in the input text to thereby create relationships among the dynamically extracted attributes and the entities in the input text.

In some embodiments, this dynamic attribute extraction can be accomplished by adding a rules layer to an AI platform on which a texting mining engine runs. The rules layer has a plurality of rules. In this disclosure, a rule can have three parts. The first part of the rule relates to finding and extracting a relationship pattern which essentially describes a syntax of object, predicate, and subject—a triplet in a particular pattern ("relationship pattern"). The second part of the rule relates to an entity (also referred to herein as a "named entity" or "entity of interest") to which a dynamic attribute(s) is attached. The third part of the rule relates to what action is to be taken.

In some embodiments, the rules layer can include custom rules that were not built on the AI platform (e.g., dynamic attribute extraction rules that were built on a computer system external to the AI platform and that were provided to the AI platform through an application programming interface (API) call).

With dynamic attribute extraction, named entities can be recognized and extracted from input text in a core entity recognition process performed at a low-level named entity extraction layer of the text mining engine. The rules layer is added on top of the named entity extraction layer. In some embodiments, each of the rules at the rules layer specifies a relationship pattern, an entity, and an action.

In some embodiments, entities of interest can be dynamically recognized from input text, stored in memory, and consumed by the rules layer for dynamic attribute recognition and extraction. The dynamically recognized entities can optionally be persisted and used by a downstream computing facility (e.g., e.g., for navigation, search, analytics, other AI automation, monitoring, content moderation, etc.).

In some embodiments, a method can include receiving (e.g., via a text mining API call made by an annotation service provided by an AI platform to an application), a request to extract information from unstructured text. The text mining API can provide the unstructured text to a text mining engine operating a text mining pipeline on the AI platform. The text mining pipeline can include a plurality of pipeline components such as named entity extraction, dynamic attribute extraction, and so on.

The method may include determining entities in the unstructured text. This can be done by performing (e.g., by an entity recognition engine) the named entity extraction to extract named entities from the unstructured text. Alternatively or additionally, entities of interest can be dynamically recognized (e.g., based on rules that define the proper context for each entity of interest) without having to perform the named entity extraction beforehand. The entities thus determined can be utilized in determining relationship patterns in the unstructured text. A relationship pattern can consist of an object, a predicate, and a subject.

In some embodiments, a predicate can be determined by identifying a trigger in the unstructured text by matching one of the (e.g., previously extracted or dynamically recognized) entities with a predefined entity in a utility authority file. In some embodiments, an object can be identified by locating an entity of the entities that is in close proximity to and that precedes the trigger in the unstructured text. In some embodiments, a subject can be determined by identifying a value or regular expression that is in close proximity to and that follows the trigger in the unstructured text.

In some embodiments, a triplet containing the entity, the trigger, and the value or regular expression can then be created. In some embodiments, an action is applied to the triplet (which represents the relationship pattern), wherein the action comprises obtaining the value from the unstructured text or translating the regular expression. The value or a result from the translating to the entity is assigned or otherwise attached as a dynamic attribute of the entity. The annotation service returns the dynamic attribute to the application (e.g., in the form of annotated text annotated with the entities and dynamically extracted attributes attached to the entities). The dynamic attributes thus extracted can be stored for use by a downstream computing facility.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIG. 2 is a flow chart illustrating an example of a method for dynamic attribute extraction according to some embodiments disclosed herein.

FIG. 3 is a flow chart illustrating another example of a method for dynamic attribute extraction according to some embodiments disclosed herein.

FIG. 4A depicts a diagrammatic representation of an example of a user interface of an application adapted for utilizing an annotation service provided by an AI platform for dynamic attribute extraction according to some embodiments disclosed herein.

FIG. 4B depicts a diagrammatic representation of an example of a user interface of an application adapted for visualizing a result of a text mining analysis performed by a text mining engine operating on an AI platform according to some embodiments disclosed herein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1A:
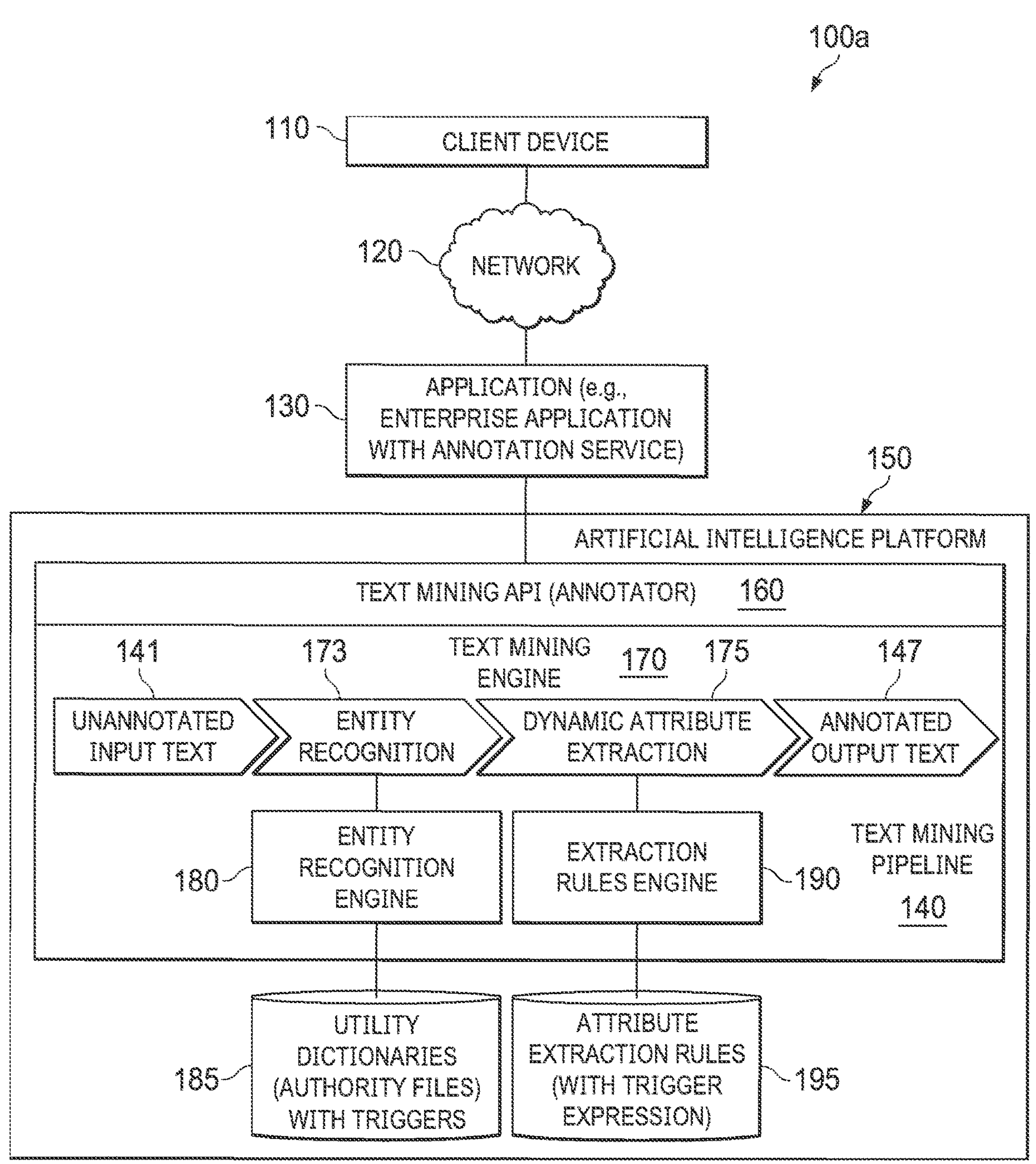
FIG. 1A depicts a diagrammatic representation of an example of an AI platform having a text mining engine enhanced with dynamic attribute extraction capability and operating in a network computing environment according to some embodiments disclosed herein

FIG. 1A depicts a diagrammatic representation of an example of an AI platform 150 operating in a network computing environment 100*a* according to some embodiments disclosed herein. AI platform 150 has a text mining engine 170 enhanced with dynamic attribute extraction capability 175 (e.g., a dynamic attribute extraction processor or facility).

In the example of FIG. 1A, a client device 110 can access, through a network 120, an application 130. An example of application 130 can be an enterprise application supported by an AI platform 150. As shown in FIG. 1A, AI platform 150 can include a text mining API 160 that communicates with text mining engine 170.

Text mining engine 170 operates a text mining pipeline 140 that processes unstructured, unannotated input text 141 and generates annotated output text 147. Text mining pipeline 140 can have a plurality of text mining pipeline components or processors that are chained or linked together and that perform various text mining functions. For the sake of illustration and not of limitation, FIG. 1A shows two text mining pipeline components—entity recognition 173 and dynamic attribute extraction 175.

As shown in FIG. 1A, an entity recognition engine 180 can access utility dictionaries 185 (which are also referred to herein as utility authority files or UAFs) which store predefined entities. At runtime, entity recognition engine is operable to examine input text 141, identify words that match the predefined entities stored in the UAFs, and extract matched words from input text 141 as named entities.

In some embodiments, the extracted named entities are further processed through a new text mining pipeline component of text mining pipeline 140, dynamic attribute extraction 175, downstream from entity recognition 173. In this case, dynamic attribute extraction 175 is performed by an extraction rules engine 190, utilizing attribute extraction rules 195 stored and maintained on AI platform 150.

In some embodiments, attribute extraction rules 195 are not accessible on the client side, for instance, through a frontend user interface (UI) such as a UI of application 130. In some embodiments, some attribute extraction rules can be built on the client side and provided to AI platform 150 (e.g., through an API call) for use by extraction rules engine 190.

In some embodiments, extraction rules can be grouped based on the domain. Each group of extraction rules can be persisted in a separate database structure. For instance, they can be persisted along with UAFs and knowledgebase (KB) of commonly known names (e.g., places, people, companies, brands, etc.).

Figure 1B:
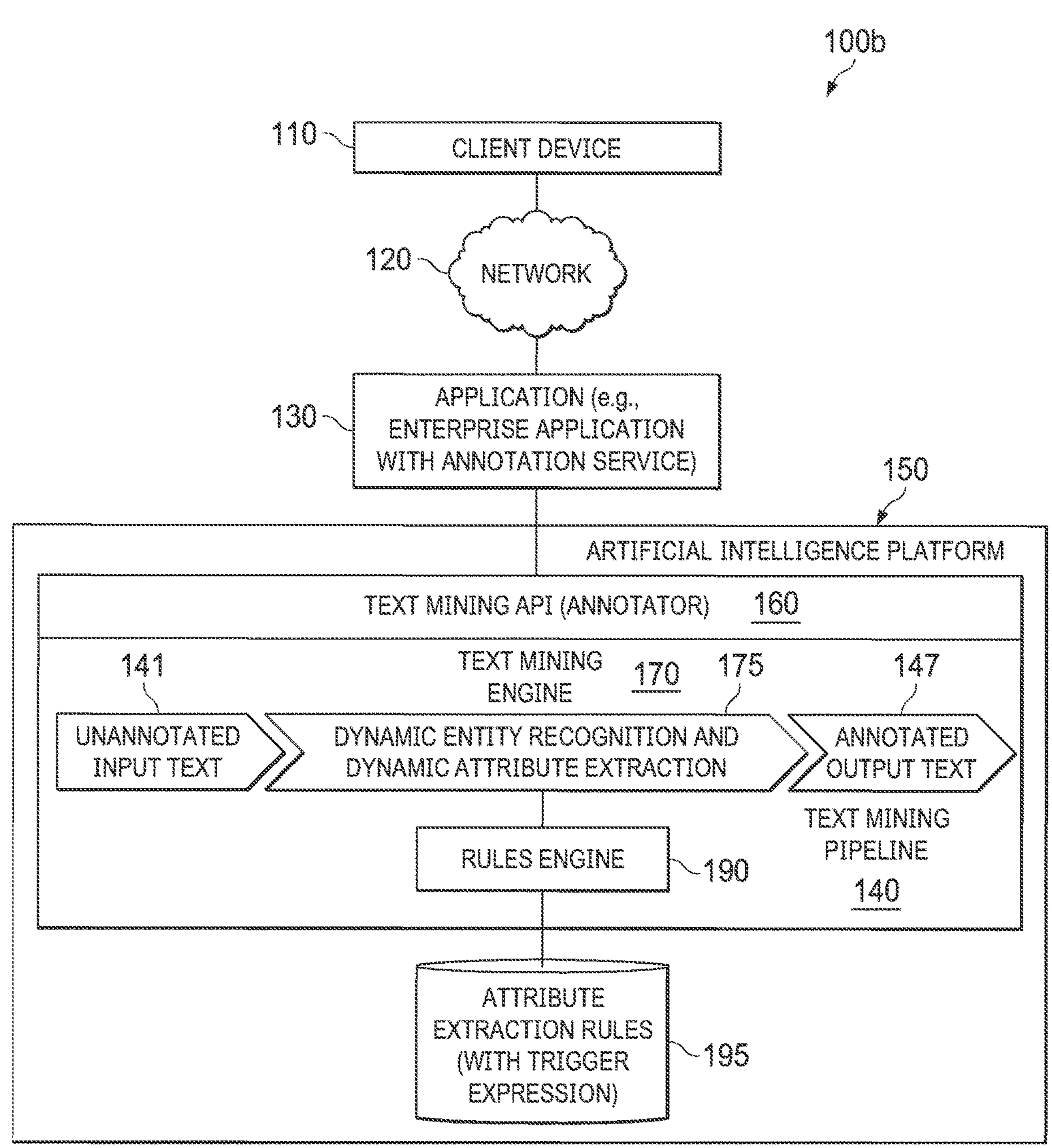
FIG. 1B depicts a diagrammatic representation of another example of an AI platform having a text mining engine enhanced with dynamic entity recognition and dynamic attribute extraction capabilities and operating in a network computing environment according to some embodiments disclosed herein.

As shown in FIG. 1B, in some embodiments, a rules engine 190 can be adapted for dynamically recognizing entities of interest in input text. In some embodiments, the entities of interest thus determined are kept in memory for dynamic attribute extraction. In some embodiments, the entities of interest thus determined can be persisted on AI platform 150 so that they can be leveraged by a downstream computing facility.

As alluded to above, an example of application 130 can be an enterprise application supported by AI platform 150. Non-limiting examples of such an enterprise application can be a client application of an enterprise-class system such as an electronic document management system, a document information processing and data capture system, a content server, an enterprise content management system, an enterprise information management system, etc. Such an enterprise-class system may operate on the premises of an enterprise in an enterprise network, in a private cloud computing environment, or a combination thereof.

AI platform 150 may provide a variety of services utilized by application 130. Examples of such services can include an annotation service. By adding a rule-based dynamic attribute extraction pipeline component to text mining pipeline 140, text mining engine 170 can enable application 130 with the ability, through the annotation service, to request an analysis of relationships between entities in input text and receive dynamic attributes extracted, on the fly, from the input text provided to AI platform 150. An example of this process is illustrated in FIG. 2.

In the example of FIG. 2, a method 200 for dynamic attribute extraction can include determining entities in the input text (201). In some embodiments, this can be one by running the input text through an entity recognition process which identifies named entities in the input text utilizing UAFs (e.g., utility dictionaries 185) and extracts the named entities from the input text.

In some embodiments, entities of interest in the input text can be determined dynamically without any previous entity extraction (e.g., FIG. 1B). That is, method 200 can begin with determining relationship patterns (e.g., as defined in certain rules) in the input text (205). This determination can be made by a rules engine which examines the context where a value appears in the input text. For instance, a rule can define that if a text string is followed by a value in the input text, then the text string is the trigger and the value is to be dynamically extracted. A rule can define that a trigger can be a predefined word or phrase and that any value (e.g., text, numeric, alphanumeric, etc.) that follows the predefined word or phrase should be extracted. Another rule can specify that a particular entity is a product name and that if the product name is mentioned in the input text, look for any mention of a price, SKU, etc. Each rule may use a predicate, a prefix, a suffix, or a distance to define its scope.

In some embodiments, rules can be complex in the sense that they can refer to different named entity types or different annotations for various purposes (e.g., classification). For instance, suppose the system recognizes that the sentiment or tonality for a document or paragraph is negative. Further suppose that the system recognizes that a product name is mentioned in the paragraph that has been identified as negative from the tonality standpoint. A complex rule can be constructed to specify that, if there is a paragraph that has gone through a sentiment analysis and that has been determined as being negative, a product name is mentioned in the paragraph, and a dynamically extracted attribute is "battery," then add the dynamically extracted attribute and the negative tonality to the product. This means that the system could infer, from all the information aggregated through a text mining pipeline, something negative is being said in the input (e.g., a document) about the battery about this product. The system can then classify the document accordingly.

In some embodiments, the rules layer is applied at the end of the text mining pipeline and can leverage all the knowledge being provided to make more advanced and complex inferences. Another system downstream from the text mining pipeline can leverage the inferences made based at least on the dynamically extracted attributes, e.g., for navigation, search, analytics, other AI automation, monitoring, content moderation, etc.

Accordingly, based on a trigger, an attribute can be identified, dynamically through application of a rule or through a previously extracted named entity (210). The attribute thus identified can then be dynamically extracted (215). The attribute thus extracted can be attached to the dynamically recognized entity of interest or to the previously extracted named entity (220). The attribute can be returned to a requester and/or stored for use by a downstream computing facility (225).

FIG. 3 is a flow chart illustrating another example of a method 300 for dynamic attribute extraction according to some embodiments disclosed herein.

In some embodiments, a dynamic attribute extraction process 300 can begin when a request to extract information from unstructured text is received from a requester (e.g., application 130, an enterprise application hosted by a server system, etc.) by a text mining API (e.g., text mining API 160) through an annotation service provided by an AI platform (e.g., AI platform 150) (301). The text mining API is operable to communicate the unstructured text to a text mining engine (e.g., text mining engine 170) operating a text mining pipeline (e.g., text mining pipeline 140) on the AI platform (305). As discussed above, the text mining pipeline can include processing components arranged in a pipeline manner, including entity extraction and dynamic attribute extraction.

In some embodiments, an entity recognition engine (e.g., entity recognition engine 180) is operable to extract named entities (e.g., people names, geographical locations, etc.) from the unstructured text (310). In some embodiments, the entity recognition engine is operable to access a utility dictionary that stores predefined named entities and extract the named entities from the unstructured text by matching words in the unstructured text with the predefined named entities in the utility dictionary. In some embodiments, the predefined named entities are stored in multiple utility dictionaries.

In some embodiments, an extraction rules engine is operable to perform dynamic attribute extraction based on rules to extract relationships between the named entities extracted by the entity recognition engine from the unstructured text (315). Each of the rules specifies a relationship pattern, an entity, and an action.

As a non-limiting example, an extraction rule can have the following elements within it, to extract the relationship between the entities:

ConditionalExpression a. Rule expressions. Each rule expression is mapped to an action mapper to perform specific actions when the rule matches.

i. Trigger Expression—is a combination of custom tag (trigger) and regular expression. Custom tags are defined in the authority files.

ii. Parameter—are the fields matching in the expression and potentially what could be the parameter type like Entity, Trigger etc.

1. Metadata—describes the parameter and its properties a.—e.g., <PN>, <GL>, <ON>, <Trigger> etc.

b. direction of the parameter from trigger c. number of occurrences of the parameters like: one or more d. trigger enabled=true/false iii. Action 1. ActionType (classify/assign value to custom attribute etc.)

a. Each ActionType is associated with an appropriate function

2. Action Parameter—provides a mapping between one or more parameter based on the trigger (e.g., <PN>:Date_Of_Birth <DT>:value)

In some embodiments, the dynamic attribute extraction performed by the extraction rules engine can include: identifying a trigger in the unstructured text by matching a predefined entity in a utility authority file with an entity that is extracted by the entity recognition engine from the unstructured text and that is specified in one of the rules; identifying the named entity by locating one of the named entities that is in close proximity to and that precedes the trigger in the unstructured text; identifying a value or regular expression that is in close proximity to and that follows the trigger in the unstructured text; creating a triplet in the relationship pattern consisting of an object, a predicate, and a subject (i.e., the named entity, the trigger, and the value or regular expression); applying the action to the relationship pattern, wherein the action comprises obtaining the value from the unstructured text or translating the regular expression; and assigning or attaching the value or a result from the translating to the named entity as a dynamic attribute of the named entity. In some embodiments, the result is returned by the text mining API through the annotation service to the application (320). Here, the result contains the annotated text annotated with the named entities and the dynamic attribute of the named entity.

The result returned through the annotation service can be utilized by the application for various purposes. For example, suppose the enterprise application comprises a classifier, it can utilize dynamic attributes thus returned to classify legal documents. As another example, suppose the enterprise application comprises a profiler, it can utilize name attributes thus returned to profile or categorize documents. As yet another example, suppose the enterprise application comprises a content server, it can utilize dynamic attributes thus returned to manage documents stored in a repository managed by the content server.

Many types of applications 130 can consume, via the annotation service, the API of the text mining engine. To reduce footprint, application 130 can make an API call to the annotation service which expects clear text and specification of what to extract. If both text and metadata (e.g., for a PDF or Word document) are required, some embodiments can include an additional API which is also part of the text mining pipeline and which can receive a binary file and extract metadata and provide same to the annotation service. The latter scenario involves two transactions instead of one.

FIG. 4A shows an example of a UI 400*a* of an application that embeds an annotation service provided by an AI platform. In this example, UI 400*a* includes an input field 410 and an UI element 420 for a user to indicate to or instruct the application to analyze text provided by the user in input field 410. In some embodiments, upon the user actuating (e.g., clicking) UI element 420, an API call is made by the annotation service embedded in the application to the text mining API which, in one embodiment, can be a REST API. The API call can include the text from input field 410.

FIG. 4B shows an example of a UI 400*b* of the application displaying the result of a text mining analysis performed by a text mining engine operating on the AI platform. In this example, the text from input field 410 is processed through a text mining pipeline which includes pipeline components for generating topics and summary, entities, concepts, and sentiment.

In the example of FIG. 4B, the result includes entities 430 such as people and places. However, the result does not include the relationships between these people and places. What is desired here is the relationship information between or among the entities. For example, suppose a person "John Martin" and a location "Montreal" are found in input text, a goal here is for the AI platform (and, more specifically, by the text mining engine through the annotation service) to determine whether "John Martin" is in "Montreal."

To achieve this goal, embodiments of a text mining engine include additional logic for understanding and processing syntax or syntactical representation embedded in input text. For instance, following the above example where a person "John Martin" and a location "Montreal" are found in the input text, the location can be considered as an attribute for the person and, as a part of a response, the requester will gets a result that, not only includes the person and the location, but also includes, under the person, an attribute which includes the location that is attached or encapsulated to the person. In this example, the person represents the main named entity, the location represents a dynamic attribute of the main named entity, and their relationship is determined dynamically based on a rule that describes such a relationship (i.e., a relationship pattern). This is further described below.

In some embodiments, in response to a text mining request received from an application through the annotation service, the text mining engine is operable to find and extract named entities and also find and extract relationship patterns. A relationship pattern has a syntactical representation that describes the syntax: object, predicate, and subject (i.e., a triplet). These triplets are extracted for their syntactic and semantic context.

In addition to describing a relationship pattern, a rule defines attributes for the different named entities being part of it (e.g., which is the main named entity, which is a dynamic attribute, etc.) and what action to take (e.g., capture the value of a dynamic attribute and associate it to the main named entity). In embodiments disclosed herein, a dynamic attribute extraction rule has these three parts.

For example, suppose a text mining request contains the input text: "The customer is John Martin. The contract number is 563738." In some embodiments, the text mining engine is operable to find named entities "customer" and "contract number" and extract these named entities. In some embodiments, the text mining engine is operable to recognize entities of interest dynamically without having to perform entity extraction.

Additionally, the text mining engine is operable to determine that, based on a utility dictionary, that "contract number" is a trigger and that, based on a rule, the trigger is part of a relationship pattern. Based on this relationship pattern, the text mining engine is operable to find "John Martin" (an entity) and "563738" (a value) that are in close proximity to the trigger, "contract number." In this example, the rule describes the former as the main named entity and describes an action of attaching the latter to the former as a dynamic attribute. Thus, the text mining engine is operable to extract "563738" and attach it to "John Martin" as a dynamic attribute of the customer "John Martin."

Such a rule can be extended (e.g., using brackets) to include one or more regular expressions. For example, the input text in the example above may be expressed as " . . . <CustomerName> . . . <ContractNumber> . . . <Number>". In this example, a rule might describe a relationship pattern of <CustomerName> <ContractNumber> <Number>, with <ContractNumber> being a trigger for the triplet.

In some embodiments, instead of rules, machine learning can be used (e.g., taking a supervised approach) to learn what constitutes a relationship pattern, which entity is the main named entity to which a dynamic attribute is attached, and what action to take with respect to the main named entity and the dynamic attribute. This kind of machine learning can be based on training examples that show what relationship patterns might look like, what proximity of names of people might look like, what contract numbers might look like, and so on. Such examples can help a machine learn how to identify and extract each triplet embedded in input text. With enough relationship patterns, a trained machine can identify triplets from complex paragraphs/multiple sentences.

Even the same piece of input text can have different naming conventions for the same entity. For instance, in FIG. 4A, the input text includes "Mr. Charles Willems" and "Mr WILLEMS," both of which refer to the same entity. The text mining engine can normalize and reconcile variations of the same entity prior to performing the dynamic attribute extraction. In this way, all of these variations are processed using the same relationship pattern.

The trigger in a relationship pattern forms a link between a main entity and an attribute that is dynamically extracted. This link creates a relationship between the extracted/dynamically recognized entities.

In the above example, "Contract Number" is the trigger that was added to a utility dictionary which describes a linguistic engineering paradigm. In the paradigm, different values can be added. For instance, it could describe that a contract number is a customer ID or it could describe different ways of how a contract number can be called. It explains what different ways to refer to a trigger in a rule. This is what is used in the rule. The paradigm and the trigger (with variations) are predefined and are referred to by a relationship pattern at runtime.

As described above, the text mining engine calls the name recognition engine which returns named entities extracted from the input text. The extraction rules engine then processes the named entities and identify triggers. A trigger can be predefined in the linguistic engineering paradigm or expressed using a regular expression for something that needs to be extracted dynamically. For instance, a trigger "contract number" can be expressed as any sequence of six numbers [0-9]{6})<ContractNumber>. An associated action can refer to the "contract number" as the output whose value is extracted out of the sequence of six numbers. That is, a trigger does not have to have a predefined value.

In some embodiments, the extraction rules engine determines whether a named entity is a trigger that will start some kind of rule application. If so, the extraction rules engine finds other named entities in proximity to the trigger (before or after) and creates a triplet of object, predicate (trigger), and subject.

In this way, the text mining engine can provide an annotated text that will leverage what can be extracted (e.g., named entities) to support what is not known (e.g., relationships between the named entities). As a non-limiting example, a rule can specify a relationship pattern as <PeopleName> . . . <ContractNumber> . . . <Numbers> and actions to be taken with respect to the relationship pattern as 1) take the value of <Numbers> and 2) assign <Numbers> to <PeopleName> as an attribute named ContractNumber.

The invention disclosed herein can have many practical applications. For instance, for crawling capabilities, if the processing includes text mining, the text mining can also federate all the metadata (e.g., named entities, their relationships, etc.) into a given persistence layer. This persistence can be implemented as part of a search index, provided by Solr, can be stored in a relational database management system (RDBMS) where measurement for BI reporting can be done through visualization, can be stored into APACHE SPARK and APACHE HADOOP for large scale analyses, and so on. Depending upon uses, such metadata can be sent to different places. That is, information provided by the text mining engine can be on demand and/or aggregated if necessary. For instance, a user is creating a new document through application 130. A hook embedded in application can call the text mining engine's API and receive the entity relationship information, among others. The entity relationship information can be added as metadata to the document that the user is creating. Based on this metadata, some reactions could be taken that affects how the document is routed and/or for what purpose, for instance, search, BI reporting, etc., where the entity relationship information is leveraged by different computing facilities in different ways.

A utility dictionary contains the minimum amount of linguistic knowledge needed to understand how a word should be a trigger. If this knowledge is not provided, then the system can create, from the input text, potential candidates for triplets.

The dynamic attribute extraction disclosed herein is different from key-value pair extraction. The latter entails extracting key-value pairs, which is something that can be useful for, for example, in building a dictionary for a chat system. Such a chat system is configured to answer different questions in a question-and-answer system. That is, key-value pairs are extracted as questions and answers and stored as such in a database. The chat system can answer questions with answers stored in the database.

The dynamic attribute extraction disclosed herein creates relationships between named entities based on rules that describe the syntactical context of the named entities. Dynamic attributes extracted this way are not predefined. By contrast, static attributes are predefined. A typical static attribute is for a geographic location. For example, Montreal is in Quebec. Quebec is in Canada. Canada is in North America. North America is in America. Static attributes can be used to describe the parent-child relationships of these geographic locations. This is an example of how static knowledge can be injected into a utility dictionary file.

Unlike static attributes, a query for dynamic attribute extraction asks for information embedded in the text (e.g., phone numbers, person names, etc.) and not predefined in an ontology, database, or file. That is, instead of defining certain attributes beforehand, rules are defined and used to find dynamic information (e.g., customer numbers, customer identifiers, product names, etc.) that was not available beforehand. That is, a text mining engine implementing the dynamic attribute extraction disclosed herein is operable to determine, in real time and with syntactical information derived from input text, what dynamic information is in the input text and what relationship is in the dynamic information, without relying on an ontology or database.

In the above example, a human reader can readily recognize, from the text provided, how a person named John Martin relates to a contract number. This is not possible with conventional text mining engines. With the dynamic attribute extraction disclosed herein, a text mining engine can recognize that there is an attribute in the text provided for a person named John Martin, determine that this attribute is a contract number, and attach that contract number to the person named John Martin, without relying on an ontology or database.

Static attribute extraction and dynamic attribute extraction can be complementary. In some cases, the same attribute can be extracted through static attribute extraction and/or dynamic attribute extraction.

For instance, suppose a task needed is to apply entity recognition against product names. With static attribute extraction, a utility dictionary file may store all the product names for an enterprise and include a static attribute named "SKU" for tracking the stock keeping units of the products. Applying entity recognition with machine learning, this static attribute "SKU" is accessible because it can be retrieved by a client when a product name is extracted from the text.

The same information can be dynamically extracted if it is part of a relationship pattern. For example, suppose a dynamic attribute extraction rule describes a relationship pattern: "product name," "SKU," and "number." When the text mining engine detects a product name and a trigger named "SKU" followed by a number, it dynamically extracts the SKU and attaches it to the product name as a dynamic attribute based on this relationship pattern.

This is an example where the same information could be extracted because this information is already part of an ontology and could also be extracted dynamically if there is a rule for doing so. There are cases that rely on static attribute extraction. There are cases that rely on dynamic attribute extraction. Further, there are cases that could be extracted through both channels. If the same information can be obtained from two different sources, the information could be deemed as more reliable.

Figure 5:
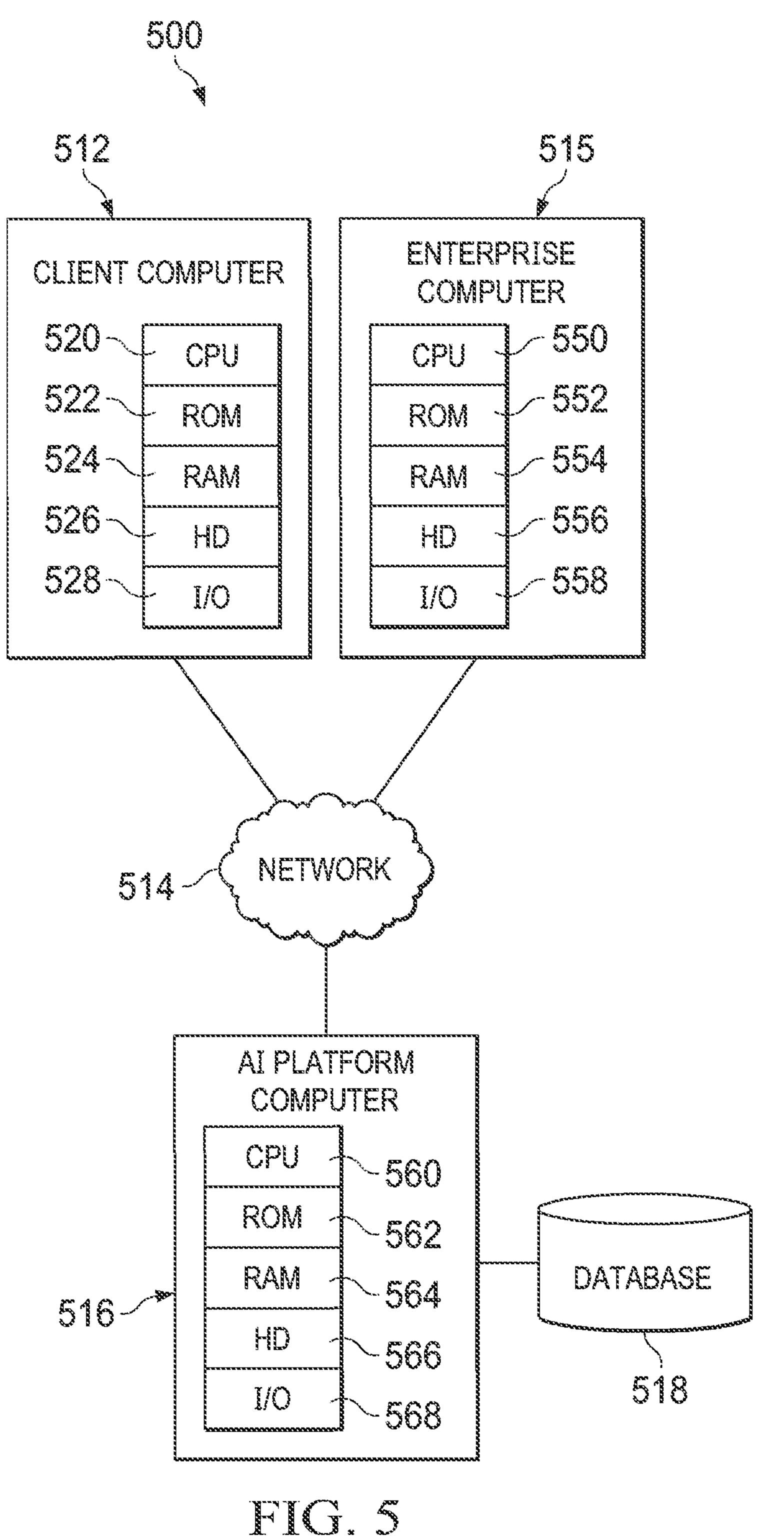
FIG. 5 depicts a diagrammatic representation of a distributed network computing environment where embodiments disclosed herein can be implemented.

FIG. 5 depicts a diagrammatic representation of a distributed network computing environment where embodiments disclosed can be implemented. In the example illustrated, network computing environment 500 includes network 514 that can be bi-directionally coupled to computer 512, computer 515, and computer 516. Computer 516 can be bi-directionally coupled to database 518. Network 514 may represent a combination of wired and wireless networks that network computing environment 500 may utilize for various types of network communications known to those skilled in the art.

For the purpose of illustration, a single system is shown for each of computer 512, computer 515, and computer 516. However, with each of computer 512, computer 515, and computer 516, a plurality of computers (not shown) may be interconnected to each other over network 514. For example, a plurality of computers 512 and a plurality of computers 515 may be coupled to network 514. Computers 512 may include data processing systems for communicating with computer 516. Computers 512 may include data processing systems for form designers whose jobs may require them to design, build, and/or customize forms used in network computing environment 500.

Computer 512 can include central processing unit ("CPU") 520, read-only memory ("ROM") 522, random access memory ("RAM") 524, hard drive ("HD") or storage memory 526, and input/output device(s) ("I/O") 528. I/O 528 can include a keyboard, monitor, printer, electronic pointing device (e.g., mouse, trackball, stylus, etc.), or the like. Computer 512 can include a desktop computer, a laptop computer, a personal digital assistant, a cellular phone, or nearly any device capable of communicating over a network. Computer 515 may be similar to computer 512 and can comprise CPU 550, ROM 552, RAM 554, HD 556, and I/O 558.

Likewise, computer 516 may include CPU 560, ROM 562, RAM 564, HD 566, and I/O 568. Computer 516 may provide AI-based services over network 514. In some embodiments, utility dictionaries and/or dynamic attribute extraction rules may be stored in database 518. Many other alternative configurations are possible and known to skilled artisans.

Each of the computers in FIG. 5 may have more than one CPU, ROM, RAM, HD, I/O, or other hardware components. For the sake of brevity, each computer is illustrated as having one of each of the hardware components, even if more than one is used. Each of computers 512, 515, and 516 is an example of a data processing system. ROM 522, 552, and 562; RAM 524, 554, and 564; HD 526, 556, and 566; and database 518 can include media that can be read by CPU 520, 550, or 560. Therefore, these types of memories include non-transitory computer-readable storage media. These memories may be internal or external to computers 512, 515, or 516.

Portions of the methods described herein may be implemented in suitable software code that may reside within ROM 522, 552, or 562; RAM 524, 554, or 564; or HD 526, 556, or 566. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method for dynamic attribute extraction, the method comprising:

receiving, by a texting mining engine executing on a processor from a requester on a user device, a text mining request with input text;

applying, by the text mining engine, a dynamic attribute extraction rule to the input text, wherein the dynamic attribute extraction rule describes a relationship pattern, defines named entities that are part of the relationship pattern, and specifies what action to take with respect to the relationship pattern, wherein the applying comprises:

dynamically recognizing the named entities from the input text;

identifying one of the named entities dynamically recognized from the input text as a trigger;

based on the dynamic attribute extraction rule, determining that the trigger is part of the relationship pattern described in the dynamic attribute extraction rule;

based on the relationship pattern, locating, from the named entities dynamically recognized from the input text, an object and a subject that are in close proximity to the trigger, the subject comprising a value or regular expression; and based on the action, dynamically extracting the value from the input text or translating the regular expression to produce a result;

assigning or attaching, by the text mining engine to the object, the value thus dynamically extracted from the input text or the result from the translating as a dynamic attribute of the object, which is one of the named entities; and storing, by the text mining engine, the dynamic attribute for use by a downstream computing facility or returning, by the text mining engine to the requester on the user device, the dynamic attribute in response to the text mining request.

2. The method according to claim 1, further comprising:

applying a plurality of dynamic attribute extraction rules to the input text, each of the plurality of dynamic attribute extraction rules specifying a relationship pattern, an entity, and an action for dynamic attribute extraction.

3. The method according to claim 1, wherein the trigger is identified utilizing a utility dictionary.

4. The method according to claim 1, wherein the trigger comprises a word, a phrase, a text string, a tag, or a regular expression.

5. The method according to claim 1, wherein the dynamic attribute extraction rule further describes variations of the trigger.

6. The method according to claim 1, wherein the text mining request is received through a text mining application programming interface (API) configured for communicating with the text mining engine.

7. The method according to claim 6, wherein the requester comprises an application and wherein an API call to the text mining API is made by a service embedded in the application.

8. A system for dynamic attribute extraction, the system comprising:

a processor;

a non-transitory computer-readable medium; and instructions stored on the non-transitory computer-readable medium and translatable by the processor for:

receiving, from a requester on a user device, a text mining request with input text;

applying a dynamic attribute extraction rule to the input text, wherein the dynamic attribute extraction rule describes a relationship pattern, defines named entities that are part of the relationship pattern, and specifies what action to take with respect to the relationship pattern, wherein the applying comprises:

dynamically recognizing the named entities from the input text;

identifying one of the named entities dynamically recognized from the input text as a trigger;

based on the dynamic attribute extraction rule, determining that the trigger is part of the relationship pattern described in the dynamic attribute extraction rule;

based on the relationship pattern, locating, from the named entities dynamically recognized from the input text, an object and a subject that are in close proximity to the trigger, the subject comprising a value or regular expression; and based on the action, dynamically extracting the value from the input text or translating the regular expression to produce a result;

assigning or attaching, to the object, the value thus dynamically extracted from the input text or the result from the translating as a dynamic attribute of the object, which is one of the named entities; and storing the dynamic attribute for use by a downstream computing facility or returning, to the requester on the user device, the dynamic attribute in response to the text mining request.

9. The system of claim 8, wherein the instructions are further translatable by the processor for:

applying a plurality of dynamic attribute extraction rules to the input text, each of the plurality of dynamic attribute extraction rules specifying a relationship pattern, an entity, and an action for dynamic attribute extraction.

10. The system of claim 8, wherein the trigger is identified utilizing a utility dictionary.

11. The system of claim 8, wherein the trigger comprises a word, a phrase, a text string, a tag, or a regular expression.

12. The system of claim 8, wherein the dynamic attribute extraction rule further describes variations of the trigger.

13. The system of claim 8, wherein the text mining request is received through a text mining application programming interface (API) configured for communicating with a text mining engine.

14. The system of claim 13, wherein the requester comprises an application and wherein an API call to the text mining API is made by a service embedded in the application.

15. A computer program product for dynamic attribute extraction, the computer program product comprising a non-transitory computer-readable medium storing instructions translatable by a processor for:

receiving, from a requester on a user device, a text mining request with input text;

applying a dynamic attribute extraction rule to the input text, wherein the dynamic attribute extraction rule describes a relationship pattern, defines named entities that are part of the relationship pattern, and specifies what action to take with respect to the relationship pattern, wherein the applying comprises:

dynamically recognizing the named entities from the input text;

identifying one of the named entities dynamically recognized from the input text as a trigger;

based on the dynamic attribute extraction rule, determining that the trigger is part of the relationship pattern described in the dynamic attribute extraction rule;

based on the relationship pattern, locating, from the named entities dynamically recognized from the input text, an object and a subject that are in close proximity to the trigger, the subject comprising a value or regular expression; and based on the action, dynamically extracting the value from the input text or translating the regular expression to produce a result;

assigning or attaching, to the object, the value thus dynamically extracted from the input text or the result from the translating as a dynamic attribute of the object, which is one of the named entities; and storing the dynamic attribute for use by a downstream computing facility or returning, to the requester on the user device, the dynamic attribute in response to the text mining request.

16. The computer program product of claim 15, wherein the instructions are further translatable by the processor for:

applying a plurality of dynamic attribute extraction rules to the input text, each of the plurality of dynamic attribute extraction rules specifying a relationship pattern, an entity, and an action for dynamic attribute extraction.

17. The computer program product of claim 15, wherein the trigger is identified utilizing a utility dictionary.

18. The computer program product of claim 15, wherein the trigger comprises a word, a phrase, a text string, a tag, or a regular expression.

19. The computer program product of claim 15, wherein the text mining request is received through a text mining application programming interface (API) configured for communicating with a text mining engine.

20. The computer program product of claim 19, wherein the requester comprises an application and wherein an API call to the text mining API is made by a service embedded in the application.

* * * * *